United States Patent [19]
Vossen

[11] Patent Number: 5,772,219
[45] Date of Patent: Jun. 30, 1998

[54] COLLET STOP

[76] Inventor: Hubert L. Vossen, 25 Francis J. Clarke Cir., Bethel, Conn. 06801

[21] Appl. No.: 766,707

[22] Filed: Dec. 13, 1996

[51] Int. Cl.6 ...................................................... B23B 13/12
[52] U.S. Cl. ................................ 279/156; 279/53; 82/155
[58] Field of Search ......................... 279/53, 156; 82/155

[56] References Cited

U.S. PATENT DOCUMENTS

| 2,821,404 | 1/1958 | Sloan | 279/156 |
| 2,956,381 | 12/1960 | Meyer | 279/156 |
| 3,615,101 | 10/1971 | Oliver | 279/156 |
| 4,955,622 | 9/1990 | Peterson | 279/156 |
| 5,133,566 | 7/1992 | Baker | 279/156 |

*Primary Examiner*—Steven C. Bishop
*Attorney, Agent, or Firm*—Edward R. Hyde

[57] ABSTRACT

A clamping collet of the type used in spindle lathes is provided having a stop mechanism to effect accurate positioning of the workpiece. The stop mechanism includes a rod that is reasonably held in position by a locking collet.

2 Claims, 2 Drawing Sheets

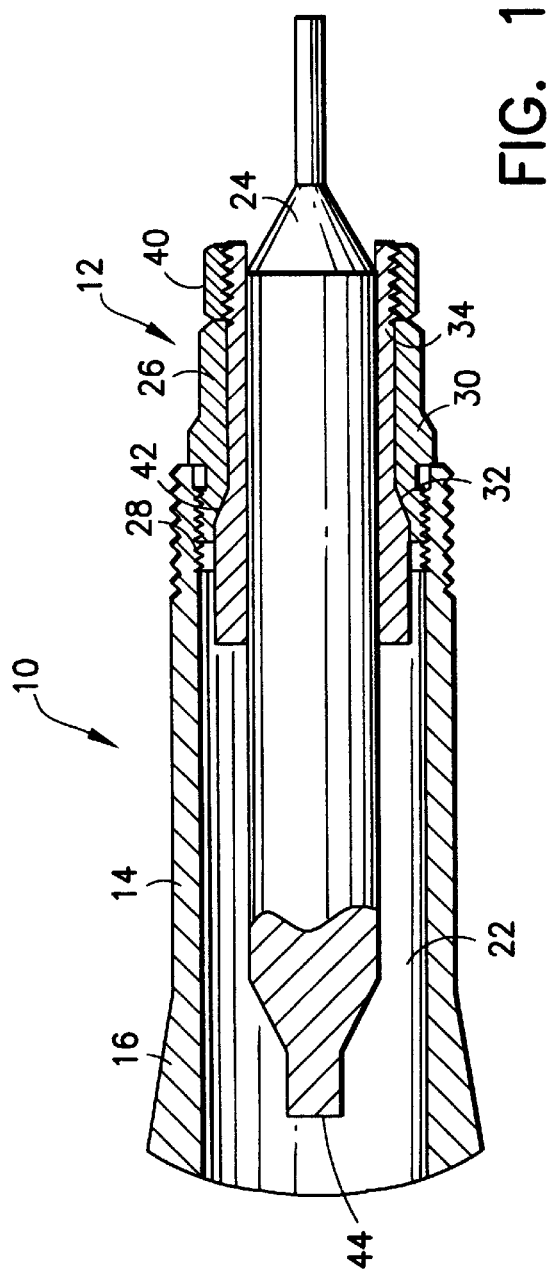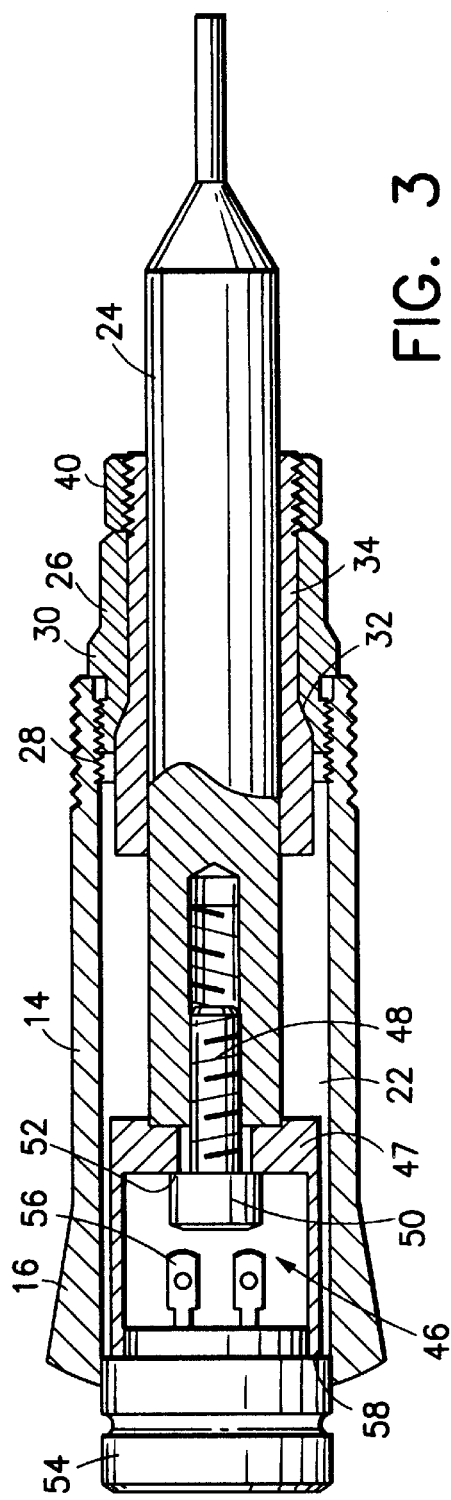

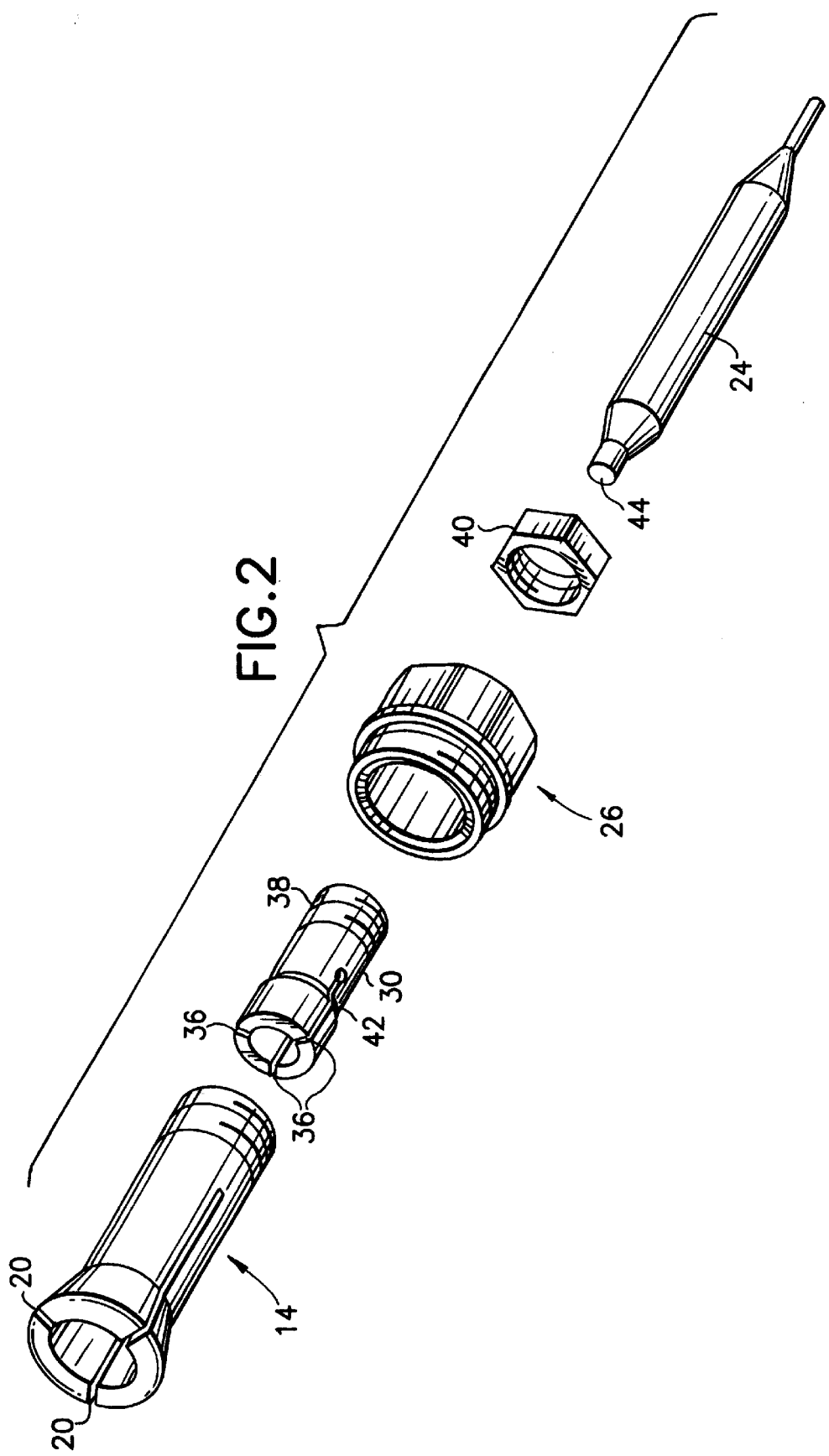

COLLET STOP

BACKGROUND OF THE INVENTION

1. Field of the Invention

The present invention relates to work piece clamping collets for general use in spindle lathes and in particular to a novel collet stop mechanism for positioning a work piece within a collet. The collet stop of the invention is readily adjustable and changeable to accept stops of varying size.

Spindle lathes are commonly known machine tools for supporting work pieces to selectively remove material therefrom. Generally there are a plurality of spindles mounted in a circular array on an assembly so that each spindle with a work piece therein can be brought into place for material removal. Each spindle has a collet of conventional construction for gripping a work piece and the collet is sometimes known as a chuck or clamping collet. A work piece inserted in a collet must be held in a fixed predetermined axial position and to accomplish this a stop mechanism is provided for each collet. The prior art discloses varies types of stop mechanisms.

2. Description of the Prior Art

The stop mechanism conventionally includes a rod like stop member that is located on the axis of the collet and positioned in a predetermined depth within the collet. The stop member must be held securely to prevent mispositioning of the work piece. Further, the stop should be held in a manner so that it can be readily released for readjustment. The prior art discloses various arrangements for release of the gripping of the stop rod. These include clamping type arrangements, set screws and other securing mechanisms.

Examples of set screw type securing arrangements are seen in U.S. Pat. Nos. 4,955,622 and 5,050,896. In another arrangement, the collet itself serves to clamp the stop rod and this is shown in U.S. Pat. No. 5,133,566. Other arrangements for securing the stop rod are shown in U.S. Pat. Nos. 5,474,308 and 5,058,467.

SUMMARY OF THE INVENTION

The present invention provides a collet stop mechanism that securely and firmly holds the stop rod in its fixed predetermined position insuring against axial movement thereof and consequent mispositioning of the work piece. Further the present invention provides a mechanism that affords easy and quick releasing of the stop rod for readjustment.

The present invention may be conveniently used with a conventional 5C collet.

The stop mechanism contemplates a locking collet that is received within the clamping collet and is surrounded by a body member that is located at a predetermined position with respect to the end of the clamping collet.

The stop rod is received within the clamping collet which has a plurality of elongated slots to permit the end of the locking collet to be compressed inwardly to grip the stop rod. A locking nut is provided to actuate the locking collet to its stop rod gripping and releasing positions.

According, it is a primary object of the present invention to provide a collet stop that firmly and securely grips a stop rod in position within a clamping collet or chuck.

Another object of the present invention is to provide a stop mechanism that is readily releasable for readjustment of the stop rod.

A still further object of the present invention is to provide an efficient and reliable collet stop mechanism that readily positions a work piece to the proper depth within a collet and insures against axial movement of the work piece.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein which:

FIG. 1 is a sectional side view of the collet stop mechanism of the present invention;

FIG. 2 is an exploded view of the collet stop mechanism of FIG. 1; and

FIG. 3 is a sectional side view of a modification of the collet stop of FIG. 1.

DESCRIPTION OF THE PREFERRED EMBODIMENT:

Referring now to the drawings and more particularly to FIGS. 1 and 2, 10 indicates a clamping collet for a work piece having a stop mechanism 12 located therein. This includes the clamping collet 14 having a flared outer end 16 which has a cylindrical bore 22 passing therethrough that in turn receives a work piece (not shown). The collet 14 is of conventional construction and may be of the 5C type. As is known, this collet has a plurality of longitudinal slots 20 passing transversely through the flared outer end 16 and through a portion of the body or shank of the collet as more clearly seen in FIG. 2. These slots permit compression of the outer end of the collet to grip a work piece.

As is understood, the work piece positioned within bore 22 will extend into the bore 22 of the collet to a depth determined by a stop rod 24 which is an element of the stop mechanism 12. A generally cylindrical body member 26 is externally threaded at its outer end as at 28 and screw threaded within the collet 14 which is internally threaded at its inner end. In this manner the body 26 is secured within the collet 14. The relative positions of the collet and body are fixed by a raised lip 30 which cooperates with the inner end of the collet 14 in abutting relation when the pieces are in place as clearly seen in FIG. 1.

The outer or left end portion of body 26 has a circular conical surface 32 for a purpose to be hereafter described. A locking collet 34 is received within the body member 26. As more clearly seen in FIG. 2, the locking collet has an enlarged outer end containing a plurality of longitudinal slots 36 transversely passing therethrough to permit compression of the end of the locking collet. As shown there are three slots but four or more could be provided. The inner end is externally threaded as at 38 to receive an internally threaded locking nut 40. The inner end of the enlarged portion of the locking collet has a conical surface 42 which cooperates with the conical surface of body member 32 when the pieces are in position as shown in FIG. 1. It has been found that an appropriate angle of the conical surface with respect to the axis of the mechanism is 20 to 45 degrees. The locking collet receives the stop rod 24 which is of a diameter substantially equal to the inner bore of the locking collet to permit a snug sliding movement when the outer end of the locking collet is in its released position. As is understood, clockwise rotation of the locking nut 40 will serve to urge the locking collet 34 to the right as seen in FIG. 1 and the two conical surfaces will tend to cam the three outer segments of the locking collet in a radially inward direction to grip the stop rod 24. In this manner the stop rod is held in a tight, secure predetermined position within the collet 14 and the outer end 44 of the stop rod determines the depth within which the work piece is positioned.

It sometimes occurs that a work piece will have elements such as projections which could be damaged if they came in contact with the outer end of a stop rod 24. Accordingly there is provided a modification of the above described embodiment which is more clearly shown FIG. 3. The various elements of the locking mechanism of FIG. 3 are generally similar to that of FIG. 1 and are designated with the same numbers. However, the outer or left end of stop rod 24 is modified to accept a cup shaped element 46. The end of rod 24 is bored and internally threaded as at 48 to receive a machine screw 50 that secures the cup 46 to the end of the stop rod. In order to insure proper alignment, the base 47 of cup 46 is spotfaced or counterbored as at 52 to receive the end of rod 24 as shown. Numeral 54 indicates a work piece that may have electrical contacts 56 protruding from the bottom thereof and it is these contacts that would be damaged if they came into contact with the end of stop rod 24. Thus, the cup 46 is provided having an outer edge 58 that contacts the work piece 54 in such a manner that the contacts 56 are safely positioned within the cup. Of course, work piece 54 is shown by way of example and numerous other types of work pieces may be used with the cup embodiment of FIG. 3.

Having thus described the invention with particular reference to the preferred forms thereof, it will be obvious that various changes and modifications may be made therein without departing from the spirit and scope of the invention as defined in the appended claims.

What is claimed is:

1. A work piece positioning mechanism comprising:

a collet having a cylindrical body and a flared outer end;

said collet having a cylindrical bore passing there through and a plurality of longitudinal slots passing traversely through the said flared outer end whereby a work piece may be positioned within said bore a predetermined distance from the outer flared end;

a work piece stop mechanism comprising a cylindrical body having external threads at the outer end thereof to secure to the inner end of said collet and a conical inner surface at the outer end thereof;

a cylindrical locking collet received within said body having an outer conical surface adapted to engage the said inner conical surface of the body;

said locking collet having a plurality of longitudinal slots passing traversely therethrough toward the outer end thereof;

the inner end of said locking collet being externally threaded;

a locking nut threaded to the inner end of the locking collet and abutting the inner end of said body;

stop rod means slidably located within a cylindrical bore passing through said locking collet and being adapted to be axially positioned at a predetermined location within said collet;

said body conical surface and said locking collet conical surface cooperating upon rotation of the locking nut to selectively compress and release the outer end of the locking collet to selectively grip and release said stop rod means;

said body conical surface and said locking collet conical surface each having an angle with respect to the axis of the stop mechanism within the range of 20 to 45 degrees.

2. A mechanism as set forth in claim 1 including cup means and means to secure the cup means to the outer end of the stop rod.

* * * * *